United States Patent
Lonberger et al.

(10) Patent No.: US 12,285,991 B2
(45) Date of Patent: Apr. 29, 2025

(54) THERMAL SYSTEM FOR AUTONOMOUS VEHICLE

(71) Applicant: Nuro, Inc., Mountain View, CA (US)

(72) Inventors: Luke Herbert Lonberger, Los Gatos, CA (US); André Barkhodaee, Mountain View, CA (US); Nathan Bozzo, San Martin, CA (US); Brent B. Hopkins, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 211 days.

(21) Appl. No.: 17/984,785

(22) Filed: Nov. 10, 2022

(65) Prior Publication Data

US 2023/0202256 A1 Jun. 29, 2023

Related U.S. Application Data

(60) Provisional application No. 63/294,166, filed on Dec. 28, 2021.

(51) Int. Cl.
*B60H 3/00* (2006.01)
*B60H 1/00* (2006.01)
*B60H 1/32* (2006.01)

(52) U.S. Cl.
CPC ..... *B60H 1/00271* (2013.01); *B60H 1/00035* (2013.01); *B60H 1/00571* (2013.01); *B60H 1/3205* (2013.01); *B60H 2001/00114* (2013.01)

(58) Field of Classification Search
CPC ............ B60H 1/00271; B60H 1/00035; B60H 1/00571; B60H 1/3205; B60H 2001/00114
USPC .......................................................... 165/42
See application file for complete search history.

(56) References Cited

U.S. PATENT DOCUMENTS

| 6,796,134 B1 | 9/2004 | Bucknell et al. |
| 9,249,718 B2 | 2/2016 | Yoon et al. |

FOREIGN PATENT DOCUMENTS

CA    2736341 A1 * 12/2011    ............... B60H 1/00

OTHER PUBLICATIONS

Chastain, "Internal Combustion Engine Cooling Strategies: Theory and Test," Clemson University, TigerPrints, All Theses, https://tigerprints.clemson.edu/all_theses/23, Dec. 2006, 176 pages.

* cited by examiner

*Primary Examiner* — Davis D Hwu
(74) *Attorney, Agent, or Firm* — Edell, Shapiro & Finnan, LLC

(57) ABSTRACT

According to one aspect, a thermal system of a vehicle which provides cooling to within the vehicle, e.g., within a driver and passenger carrying cabin or compartment, is effectively leveraged to provide cooling capabilities to autonomous vehicle systems. Some coolant flowing through a coolant loop included in the thermal system of a vehicle may be diverted to an offshoot loop which provides cooling to coolant included in a coolant loop configured to cool autonomous vehicle systems, e.g., a compute system that is part of an autonomous vehicle. The coolant from the thermal system of the vehicle may flow past coolant from the coolant loop configured to cool autonomous vehicle systems, and the cooled coolant from the coolant loop configured to cool the autonomous vehicle systems may flow near the autonomous vehicle systems to cool the autonomous vehicle systems.

23 Claims, 10 Drawing Sheets

THERMAL SYSTEM FOR AUTONOMOUS VEHICLE

CROSS-REFERENCE TO RELATED APPLICATION

This application claims priority to U.S. Provisional Application No. 63/294,166, filed Dec. 28, 2021, entitled "THERMAL SYSTEM FOR AUTONOMOUS VEHICLE," the entirety of which is incorporated herein by reference.

TECHNICAL FIELD

The disclosure relates to autonomous vehicles. More particularly, the disclosure relates to providing an efficient thermal system in an autonomous vehicle which facilitates the cooling of compute (computing) systems.

BACKGROUND

Autonomous vehicles typically include systems, e.g., hardware that supports the autonomous operation of the vehicles, which generate heat when in an operational mode. When such systems become too hot, the performance of such systems may be compromised. When systems in autonomous vehicles are unable to perform at a desired performance level, the safe operation of the autonomous vehicles may be called into question.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

In one embodiment, a thermal system of a vehicle which provides cooling within the vehicle, e.g., within a driver and passenger carrying cabin or compartment, is effectively leveraged to provide cooling capabilities to autonomous vehicle systems. Some coolant flowing through a coolant loop included in the thermal system of a vehicle may be diverted to an offshoot loop which provides cooling to coolant included in a coolant loop configured to cool autonomous vehicle systems, e.g., a compute (computing) system that is part of an autonomous vehicle. The coolant from the thermal system of the vehicle may flow past coolant from the coolant loop configured to cool autonomous vehicle systems, and the cooled coolant from the coolant loop may flow near the autonomous vehicle systems to cool the autonomous vehicle systems.

Description

Systems which facilitate the autonomous operation of vehicles typically generate heat. If the heat that is generated is not effectively removed, or if the systems are not cooled, then the safe operation of the vehicles may be compromised. In other words, the performance of systems which enable a vehicle to operate fully autonomously or semi-autonomously may be degraded if the systems essentially become overheated and are no longer operating in specified operational temperature ranges.

Vehicles generally include thermal systems configured to control the environment within the vehicles. For example, a thermal system may provide cooling capability to a cabin or compartment configured to accommodate a driver and/or passengers. Leveraging a thermal system configured to control the environment within a vehicle to support a cooling system configured to cool an autonomy system, e.g., a compute system on which autonomy software executes, enables the autonomy system to be cooled in an efficient manner.

In one embodiment, an overall thermal system that is suitable for use in an autonomous vehicle effectively leverages a thermal system configured to cool a cabin or compartment, e.g., a cabin configured to accommodate occupants such as passengers, to provide cooling for a thermal system configured to cool a system that supports the autonomous operation of the vehicle, e.g., a compute (or computing) system. A liquid-to-liquid interchiller arrangement may use coolant or refrigerant used in one thermal loop to cool coolant or refrigerant used in another thermal loop. By substantially siphoning some coolant from a thermal loop used to cool a cabin or compartment of a vehicle in order to cool a coolant used to provide cooling to a compute system, the compute system may be efficiently cooled without compromising the cooling of the cabin.

Figure 1A:
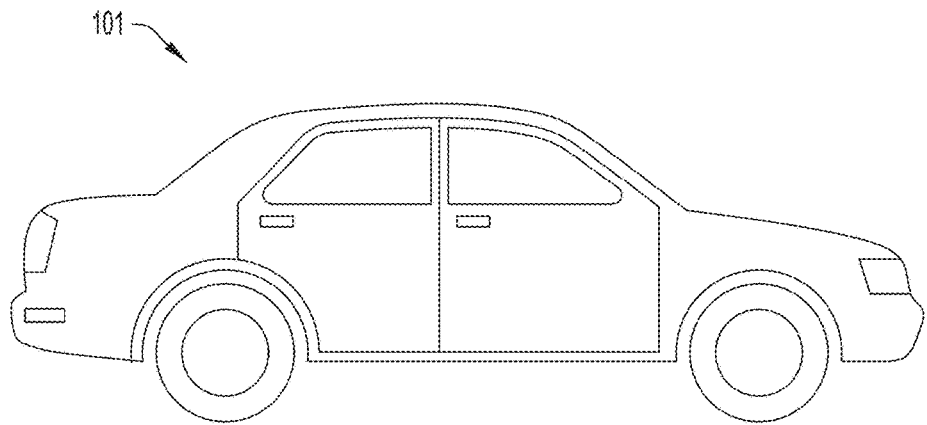
FIG. 1A is a diagrammatic representation of one example of a vehicle which may be configured to operate autonomously in accordance with an embodiment.
Figure 1B:
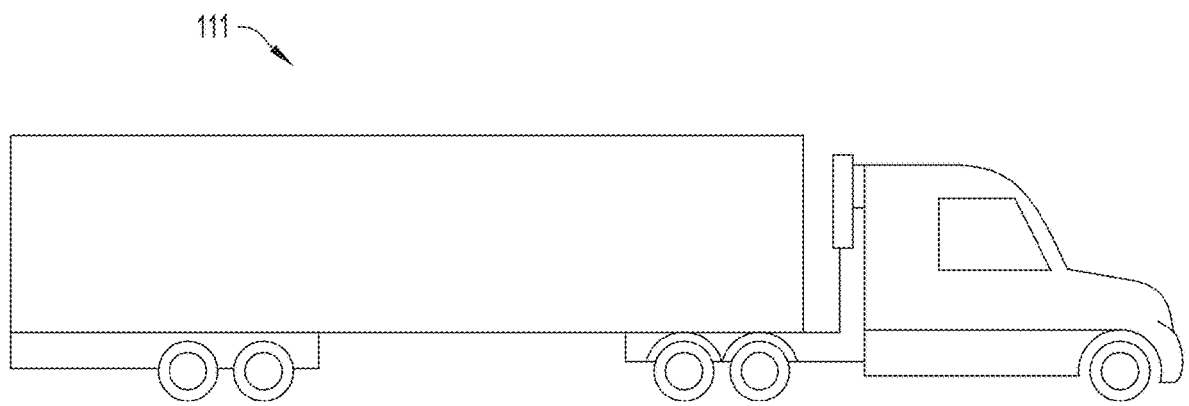
FIG. 1B is a diagrammatic representation of another example of a vehicle which may be configured to operate autonomously in accordance with an embodiment.

An overall thermal system which essentially includes two thermal loops may be implemented in any suitable vehicle. Many vehicles capable of operating autonomously, e.g., fully autonomously or semi-autonomously, may accommodate occupants such as a driver as well as passengers. FIGS. 1A and 1B are diagrammatic representations of vehicles which may be driven by a driver, e.g., a human driver or a safety driver, and may additionally be configured to operate in an autonomous mode. As shown in FIG. 1A, in one embodiment, a car 101 may be operated by a driver and also configured to operate autonomously. Configuring the car 101 to operate autonomously may include, but is not limited to including, outfitting the car 101 with sensors and autonomy software which may execute on a compute system contained in the car 101. As shown in FIG. 1B, in another embodiment, a truck 111 may be operated by a driver and also configured to operate autonomously. Similar to the car 101 of FIG. 1A, truck 111 of FIG. 1B may be outfitted with sensors, and also have autonomy software configured to execute on a compute system in truck 111.

Figure 2:
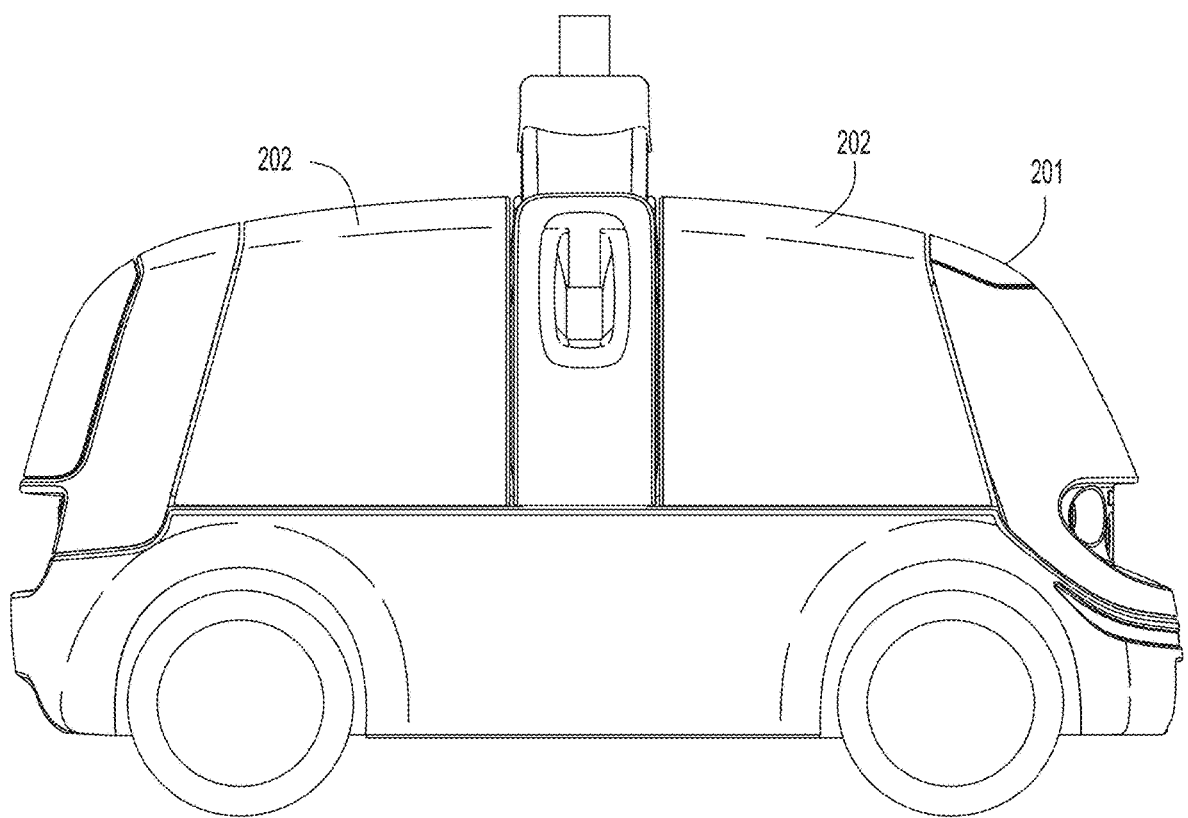
FIG. 2 is a diagrammatic representation of an autonomous vehicle in accordance with an embodiment.

Some autonomous vehicles are not configured to carry occupants. For example, some delivery vehicles may be arranged substantially only to carry cargo. FIG. 2 is a diagrammatic representation of a side of an autonomous vehicle which is arranged to transport goods in accordance with an embodiment. An autonomous vehicle 201, as shown, is a vehicle configured for land travel. Typically, autonomous vehicle 201 includes physical vehicle components such as a body or a chassis, as well as conveyance mechanisms, e.g., wheels. In one embodiment, autonomous vehicle 201 may be relatively narrow, e.g., approximately two to approximately five feet wide, and may have a relatively low mass and relatively low center of gravity for stability. Autonomous vehicle 201 may be arranged to have a working speed or velocity range of between approximately one and approximately forty-five miles per hour (mph), e.g., approximately twenty-five miles per hour. In some embodiments, autonomous vehicle 201 may have a substantially maximum speed or velocity in range between approximately thirty and approximately ninety mph.

Autonomous vehicle 201 is generally arranged to transport and/or to deliver cargo, items, and/or goods, and may be included in a fleet of vehicles. Autonomous vehicle 201 may be fully autonomous and/or semi-autonomous. In general, autonomous vehicle 201 may be a vehicle that is capable of travelling in a controlled manner for a period of time without intervention, e.g., without human intervention.

Autonomous vehicle 201 includes a plurality of compartments 202. Compartments 202 may be assigned to one or more entities, such as one or more customer, retailers, and/or vendors. Compartments 202 are generally arranged to contain cargo, items, and/or goods. Typically, compartments 202 may be secure compartments. It should be appreciated that the number of compartments 202 may vary. That is, although two compartments 202 are shown, autonomous vehicle 201 is not limited to including two compartments 202.

Figure 3:
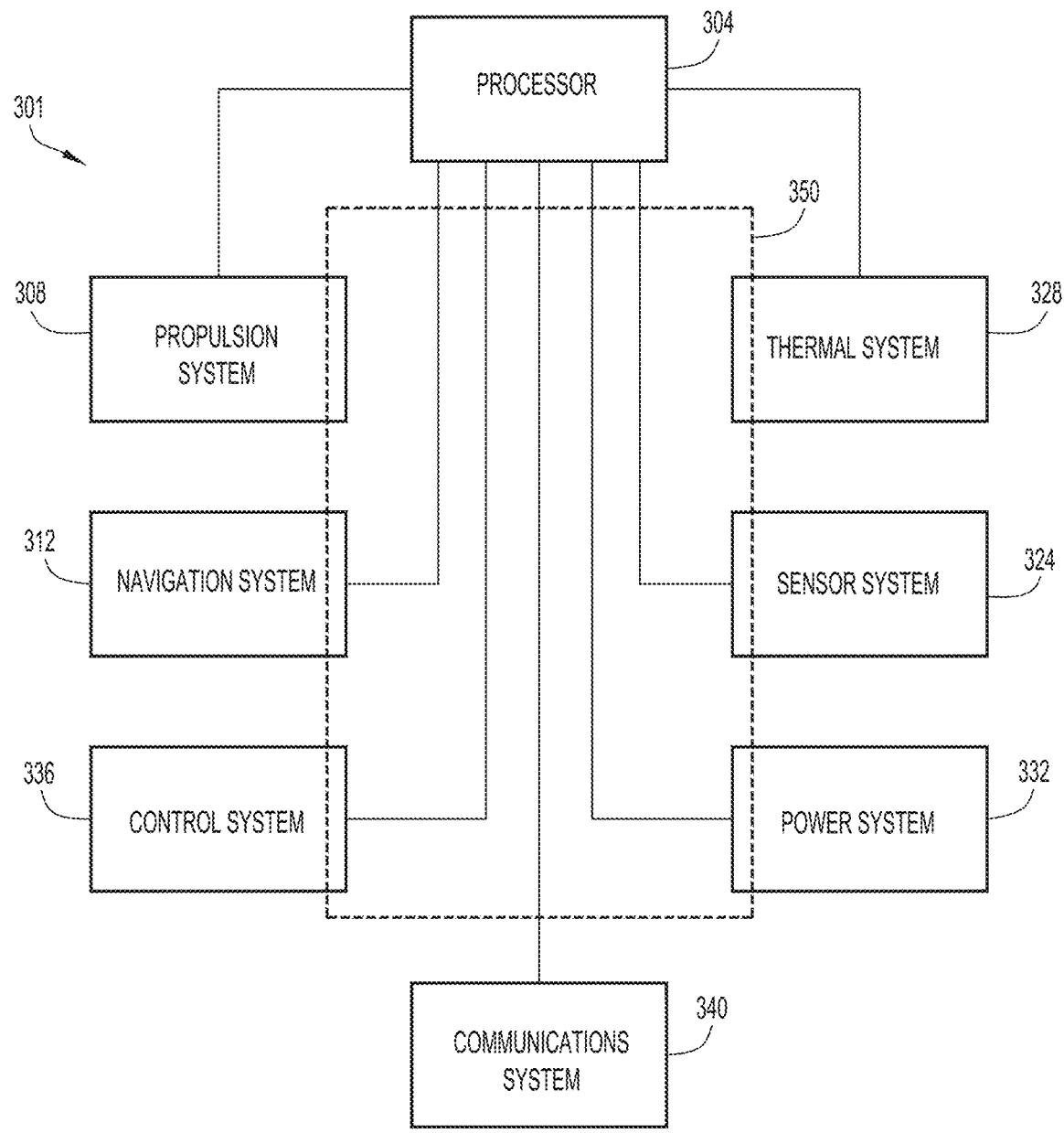
FIG. 3 is a block diagram representation of an autonomous vehicle in accordance with an embodiment.

In general, an autonomous vehicle may include systems which support the fully autonomous and/or semiautonomous operation of the vehicle. FIG. 3 is a block diagram representation of an autonomous vehicle in accordance with an embodiment. An autonomous vehicle 201 includes a processor 304, a propulsion system 308, a navigation system 312, a sensor system 324, a thermal system 328, a power system 332, a control system 336, and a communications system 340. It should be appreciated that processor 304, propulsion system 308, navigation system 312, sensor system 324, thermal system 328, and power system 332, and communications system 340 are all coupled to a chassis or body of autonomous vehicle 101.

Processor 304 is arranged to send instructions to, and to receive instructions from, or for various components such as propulsion system 308, navigation system 312, sensor system 324, thermal system 328, and power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels. Data collected by sensor system 324 may be used by a perception system associated with navigation system 312 to determine or to otherwise understand an environment around autonomous vehicle 101.

Thermal system 328 is configured to provide cooling within vehicle 301. By way of example, thermal system 328 may provide air conditioning within a cabin of a vehicle that accommodates occupants and/or to a compartment of a delivery vehicle. Thermal system 328 may include, but is not limited to including, a compressor, a radiator, a coolant reservoir, and a coolant pump. In one embodiment, thermal system 328 includes an interchiller, an additional coolant reservoir, and an additional coolant pump configured to provide cooling to a compute system as will be discussed in more detail below.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication system 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

As will be appreciated by those skilled in the art, when autonomous vehicle 301 operates autonomously, vehicle 301 may generally operate, e.g., drive, under the control of an autonomy system. That is, when autonomous vehicle 301 is in an autonomous mode, autonomous vehicle 301 is able to generally operate without a driver or a remote operator controlling autonomous vehicle. In one embodiment, autonomous vehicle 301 may operate in a semi-autonomous mode or a fully autonomous mode. When autonomous vehicle 301 operates in a semi-autonomous mode, autonomous vehicle 301 may operate autonomously at times and may operate under the control of a driver or a remote operator at other times. When autonomous vehicle 301 operates in a fully autonomous mode, autonomous vehicle 301 typically operates substantially only under the control of an autonomy system. The ability of an autonomous system to collect information and extract relevant knowledge from the environment provides autonomous vehicle 301 with perception capabilities. For example, data or information obtained from sensor system 324 may be processed such that the environment around autonomous vehicle 301 may effectively be perceived.

In one embodiment, an autonomy system 350 comprised of at least parts of propulsion system 308, navigation system 312, sensor system 324, power system 332, and control system 336 is part of a compute system, or hardware and/or software logic configured to enable vehicle 301 to operate autonomously. Thermal system 328 may be configured to provide cooling to vehicle 301, as for example, to keep occupants of vehicle 301 comfortable while vehicle 301 operates, as well as to assist in cooling the compute system. Providing cooling to the compute system allows the compute system to be maintained at an operational temperature, and generally allows the compute system to perform at a desired level.

Thermal system 328 of vehicle 301 may include a coolant or a refrigerant which flows through tubes or pipes to provide cooling capabilities within vehicle 301. Thermal system 328 may include a vehicle thermal system arranged to control a temperature within vehicle 301, as well as a compute thermal system arranged to control a temperature of compute or autonomy system 350 within vehicle 301. By utilizing some of the coolant included in thermal system 328 to effectively provide cooling to a compute or autonomy system 350, compute or autonomy system 350 may be cooled substantially without compromising the ability of thermal system 328 to provide cooling capabilities within vehicle 301.

Figure 4:
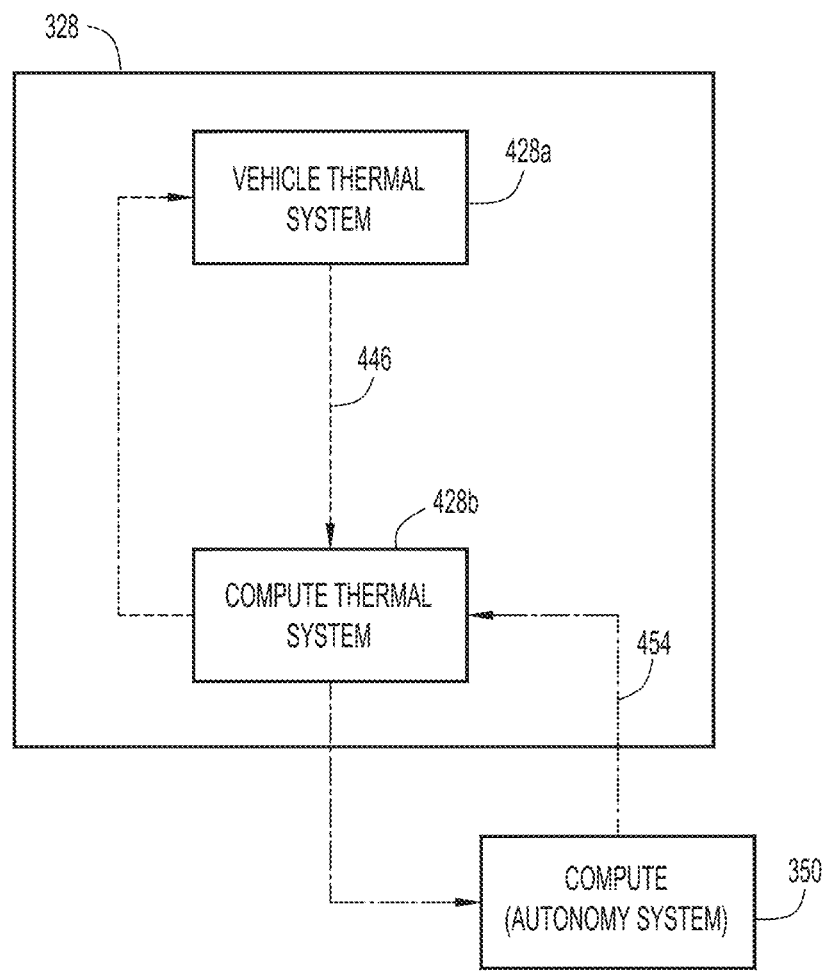
FIG. 4 is a block diagram representation of an overall thermal system that is suitable for use in an autonomous vehicle, e.g., thermal system 328 of FIG. 3, in accordance with an embodiment.

FIG. 4 is a block diagram representation of an overall thermal system that is suitable for use in an autonomous vehicle, e.g., thermal system 328 of FIG. 3, in accordance with an embodiment. Overall thermal system 328 generally includes a vehicle thermal system 428a and a compute thermal system 428b. Vehicle thermal system 428a is generally configured to provide cooling and/or heating to at least one cabin or compartment that carries occupants of a vehicle, such as vehicle 301 of FIG. 3. Compute thermal system 428b is configured to provide cooling to a compute system 350, or a system which is configured to provide autonomy capabilities to a vehicle such as vehicle 301 of FIG. 3.

Vehicle thermal system 428a generally includes a vehicle coolant, or refrigerant, loop. A coolant such as a vehicle coolant may generally be any suitable heat transfer fluid. Suitable heat transfer fluids may include, but are not limited to including, water, refrigerant, antifreeze, and/or oil. While vehicle coolants are generally fluids or liquids, it should be appreciated that vehicle coolants may also include gasses.

Compute thermal system 428b, in one embodiment, includes a compute coolant, or refrigerant, loop 454 that effectively circulates between compute thermal system 428b and compute system 350. A portion of the vehicle coolant loop may be diverted into an offshoot loop 446 which carries some of the vehicle coolant through compute thermal system 428b to provide cooling to compute coolant that flows compute coolant loop 454. In other words, an amount of vehicle coolant may effectively be siphoned from the vehicle coolant loop within vehicle thermal system 428a, and provided to compute thermal system 428b to cool compute coolant that flows through compute coolant loop 454, before being returned to the vehicle coolant loop. In one embodiment, such a diversion or siphoning of vehicle coolant may occur when a determination is made that a compute system may benefit from cooling. In another embodiment, the diversion of vehicle coolant may occur substantially regardless of whether a compute system may benefit from cooling. The liquid-to-liquid cooling provided by offshoot loop 446 to compute coolant loop 454 enables vehicle thermal system 428a to substantially indirectly provide cooling to compute system 350.

Figure 5:
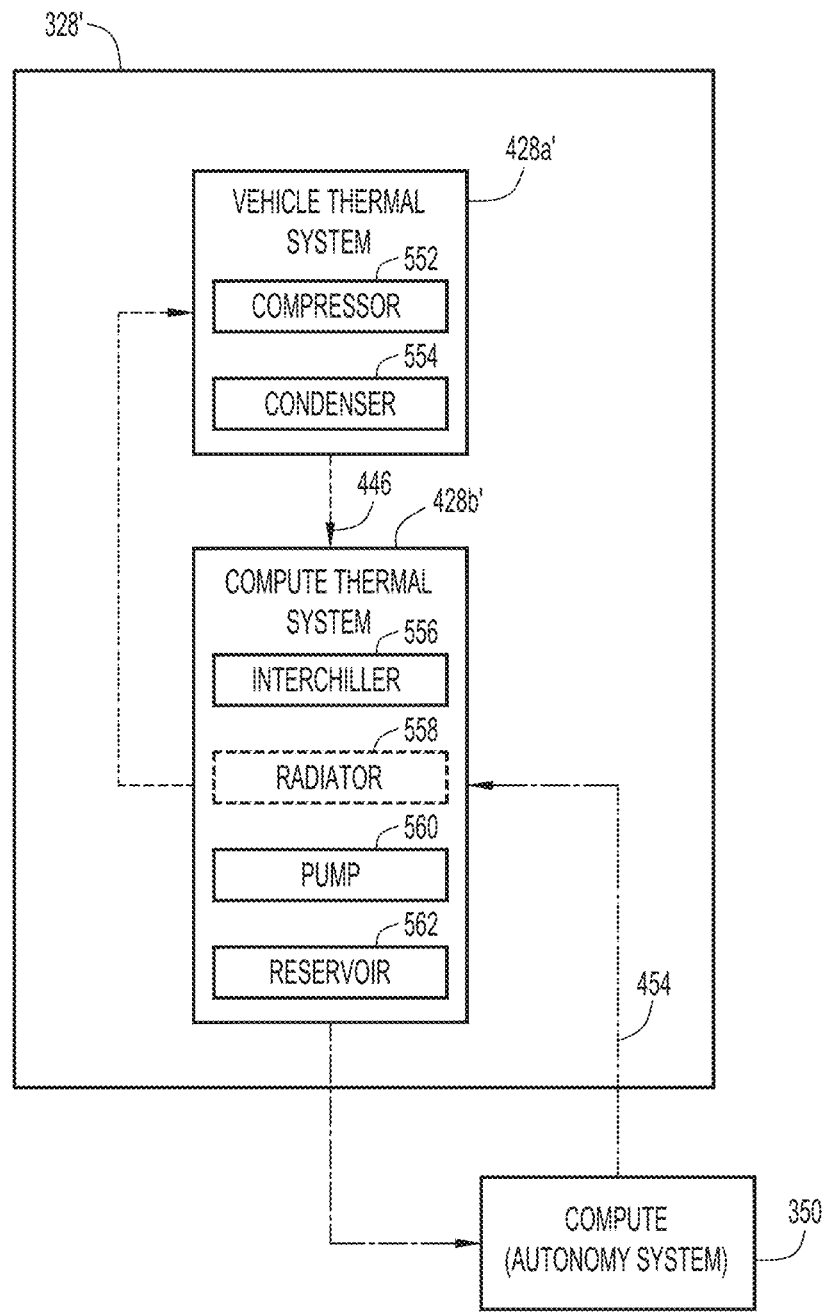
FIG. 5 is a block diagram representation of an overall thermal system that includes an interchiller and is suitable for use in an autonomous vehicle of FIGS. 3 and 4, in accordance with an embodiment.

Referring next to FIG. 5, thermal system 328 will be discussed in more detail in accordance with an embodiment. Thermal system 328' includes vehicle thermal system 428a' and compute thermal system 428b', and is generally arranged to provide cooling to compute system 350.

Thermal system 428a' includes a compressor 552 and a condenser 554. Compute thermal system 428b' includes an interchiller 556, an optional radiator 558, a pump 560, and a reservoir 562. Compressor 552 and condenser 554 are associated with a vehicle cooling loop from which an amount of vehicle coolant is siphoned or otherwise diverted to flow through offshoot loop 446 to interchiller 556 to cool compute coolant. Compute coolant flows through interchiller 556 which obtains compute coolant via pump 560 and reservoir 562. Optional radiator is configured to heat vehicle coolant carried through interchiller 556 by offshoot loop 446 in the event that the vehicle coolant and/or compute coolant is to be warmed, e.g., when vehicle coolant and/or compute coolant is effectively too cold.

Figure 6:
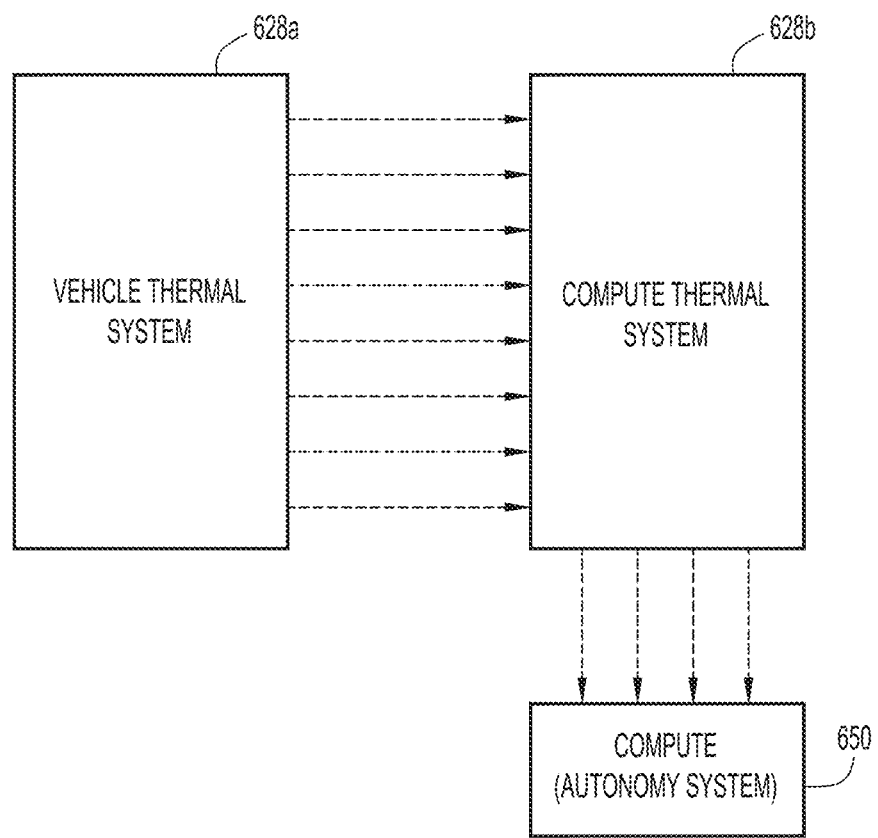
FIG. 6 is a block diagram representation of an overall thermal system which cools a compute or autonomy system in accordance with an embodiment.

In general, a vehicle thermal system provides cooling to a compute thermal system, and the compute thermal system cools a compute or autonomy system. FIG. 6 is a block diagram representation of an overall thermal system which cools a compute or autonomy system in accordance with an embodiment. An overall thermal system includes a vehicle thermal system 628a and a compute thermal system 628b. In one embodiment, vehicle thermal system 628a provides cooling to compute thermal system 628b when some vehicle coolant or refrigerant is used to cool compute coolant or refrigerant.

Compute thermal system 628b is configured to provide cooling to compute or autonomy system 650. Compute coolant, which may be chilled or cooled by vehicle coolant, may provide cooling to compute system 650 by flowing through tubes, pipes, and/or plates arranged near compute system 650. Heat generated by compute system 650 may be absorbed by the compute coolant as the compute coolant flows near, or within, compute system 650.

Figure 7:
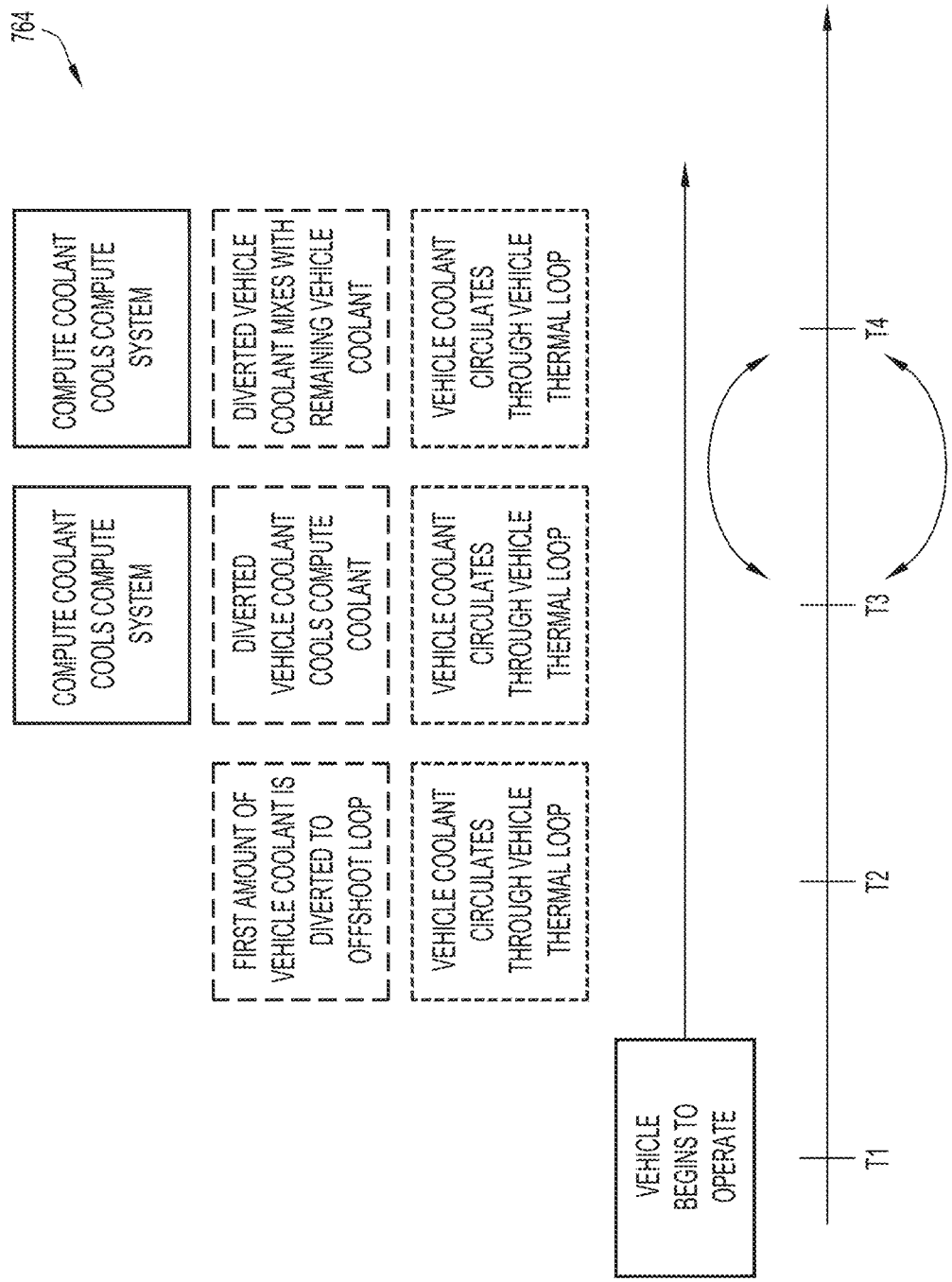
FIG. 7 is a diagrammatic representation of a timeline associated with the operation of an overall thermal system within a vehicle in accordance with an embodiment.

With reference to FIG. 7, a timeline associated with the operation of an overall thermal system within a vehicle will be discussed in accordance with an embodiment. As shown in a timeline 764, at a time T1, a vehicle which includes an overall thermal system, e.g., vehicle 301 of FIG. 3, begins to operate. At a time T2, a vehicle thermal fluid, e.g., vehicle coolant associated with a vehicle thermal system, circulates or otherwise flows through a vehicle thermal loop of the vehicle thermal system. Also at time T2, a first amount of the vehicle coolant is effectively diverted to an offshoot loop. In one embodiment, the first amount of the vehicle coolant is diverted to an offshoot loop when it is determined that a compute system is effectively in need of cooling, as for example when a temperature of the compute system is approximately equal to or greater than a threshold temperature.

At a time T3, as the vehicle continues to operate, the vehicle coolant continues to circulate through the vehicle thermal loop. In addition, the diverted vehicle coolant provides cooling at time T3 to a compute coolant that flows through a compute coolant loop of a compute thermal system. The diverted vehicle coolant may absorb heat from the compute coolant as the diverted vehicle coolant flows in the vicinity of the compute coolant. As mentioned above, the compute thermal system is arranged to cool a compute system of the vehicle, and the ability to cool the compute system involves, in one embodiment, the compute coolant providing cooling to the compute system.

At a time T4, the vehicle continues to operate, and the vehicle coolant continues to circulate through the vehicle thermal loop. The compute coolant also continues to cool the compute system at time T4. The diverted vehicle coolant mixes with the rest of the vehicle coolant, or the remaining vehicle coolant that was not diverted.

It should be appreciated that until the vehicle ceases to operate, the vehicle coolant and the compute coolant may continue to circulate or otherwise flow within the vehicle to provide cooling. That is, the occurrences at times T3 and T4, as well as the diversion of an amount of vehicle coolant to an offshoot loop, may continue until the operation of the vehicle is terminated or otherwise completed.

The components included in an overall thermal system of a vehicle may vary widely. For example, the components of an overall thermal system may include at least one condenser, at least one compressor, at least one cabin evaporator, at least one drier bottle, and/or one or more expansions valves. The components of an overall thermal system which facilitates the control of thermal characteristics, e.g., temperature characteristics, generally enable the implementation of a thermal loop that provides cooling to a vehicle cabin or compartment and a thermal loop that provides cooling for a compute system.

Figure 8:
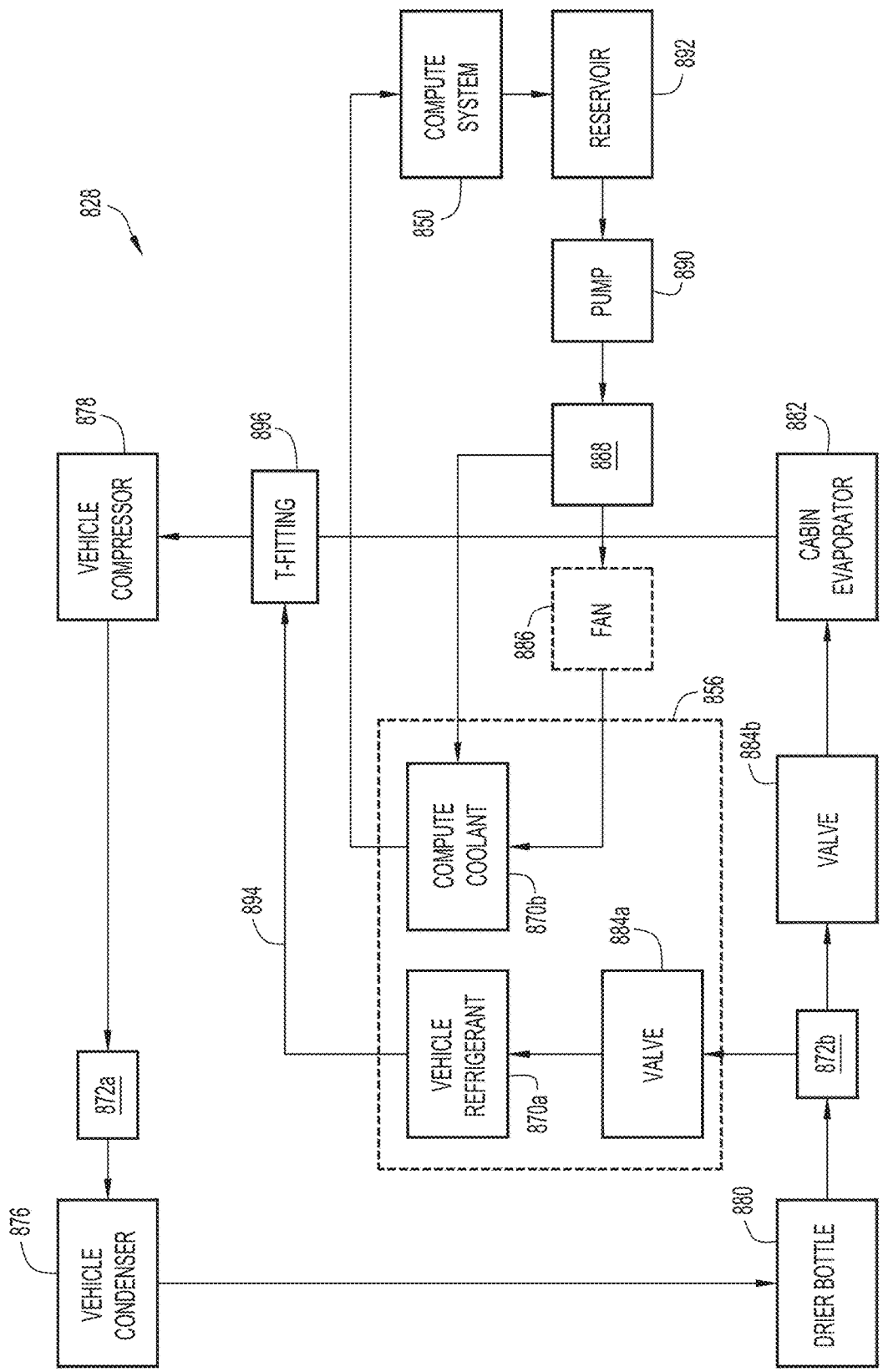
FIG. 8 is a block diagram representation of an overall thermal loop in a vehicle that provides cooling for a compute system in accordance with an embodiment.

FIG. 8 is a block diagram representation of an overall thermal loop in a vehicle that provides cooling for a compute system in accordance with an embodiment. An overall thermal loop 828 of a vehicle includes a vehicle refrigerant 870a and a compute coolant 870b which flow through a vehicle. Vehicle refrigerant 870a is effectively a part of a vehicle thermal loop, and provides cooling to compute coolant 870b which flows to provide cooling to a compute system 850. Cooling is provided within an interchiller arrangement 856 that, in one embodiment, substantially enables liquid-to-liquid cooling when vehicle refrigerant 870a cools compute coolant 870b. It should be appreciated that vehicle refrigerant 870a and compute coolant 870b generally do not physically mix together.

Vehicle refrigerant 870a may circulate through a T-fitting 872a that is coupled to a vehicle compressor 878 and to a vehicle condenser 876. Vehicle compressor 878 may typically be a part of an air-conditioning system, and may pump vehicle refrigerant 870a into vehicle condenser 876. Vehicle condenser 876 may provide vehicle refrigerant 870a to a drier bottle 880. As will be appreciated by those skilled in the art, drier bottle 880 may be used as a dehydrator and/or to at least temporarily store vehicle refrigerant 870a. In some embodiments, the drier bottle 880 is optional.

A cabin evaporator 882 may be arranged to provide air, e.g., cold air, to a cabin of a vehicle. Cabin evaporator 882 may include a heating element such as a radiator. Vehicle refrigerant 870a may flow from drier bottle 880 to a T-fitting 872b to a valve 884b which effectively controls the flow of vehicle refrigerant (vehicle coolant) 870a to cabin evaporator 882. Cabin evaporator 882 provides vehicle refrigerant 870a to vehicle compressor 878. Vehicle refrigerant 870a may also flow from T-fitting 872b through a valve 884a that is part of interchiller arrangement 856 to enable vehicle refrigerant 870a to cool compute coolant 870b in interchiller arrangement 856.

A reservoir is configured to store compute coolant 870b, and a pump 890 is configured to provide compute coolant 870b to a valve 888, e.g., a three-way valve which may be actuated based on a temperature set point. The temperature set point may vary widely, and may generally be a substantially threshold temperature that, when met or exceeded, results in compute coolant 870b being used to cool compute system 850. In one embodiment, the temperature set point may be approximately thirty-seven degrees Celsius (C), although it should be appreciated that the temperature set point is not limited to being approximately thirty-seven degrees C.

An optional radiator/fan assembly 886 may be configured to increase the temperature of compute coolant 870b. From radiator/fan assembly 886, compute coolant 870b is cooled in interchiller arrangement 856 by vehicle refrigerant 870a, and flows to compute system 850 to provide cooling to compute system 850. Once compute coolant 870b flows through compute system 850, compute coolant 870b may be held or otherwise contained in reservoir 892.

The vehicle refrigerant 870a that is diverted to the interchiller 856 to cool the compute coolant 870b is returned to the vehicle thermal system via conduit 894 and T-fitting 896 that is coupled to the vehicle compressor 878, together with vehicle refrigerant returned from the cabin evaporator 882, as shown in FIG. 8.

The conduit 894 serves as a refrigerant tap point on the vehicle's refrigerant circuit as shown in FIG. 8. The valve 884a may include a solenoid that is controlled by a programmable controller for the interchiller arrangement 856. The programmable controller, whose functions may also be performed by the control system 336 shown in FIG. 3 or the computing device 1000 shown in FIG. 10 (described below) may control the optional fan 886, water pump, and three-way valve 888. Again, the three-way valve 888 may be controlled to bypass the coolant-to-air heat exchanger. Without bypassing this heat exchanger when the interchiller arrangement is activated, the system may not perform at a level adequate for cooling autonomous vehicle compute systems.

Figure 9:
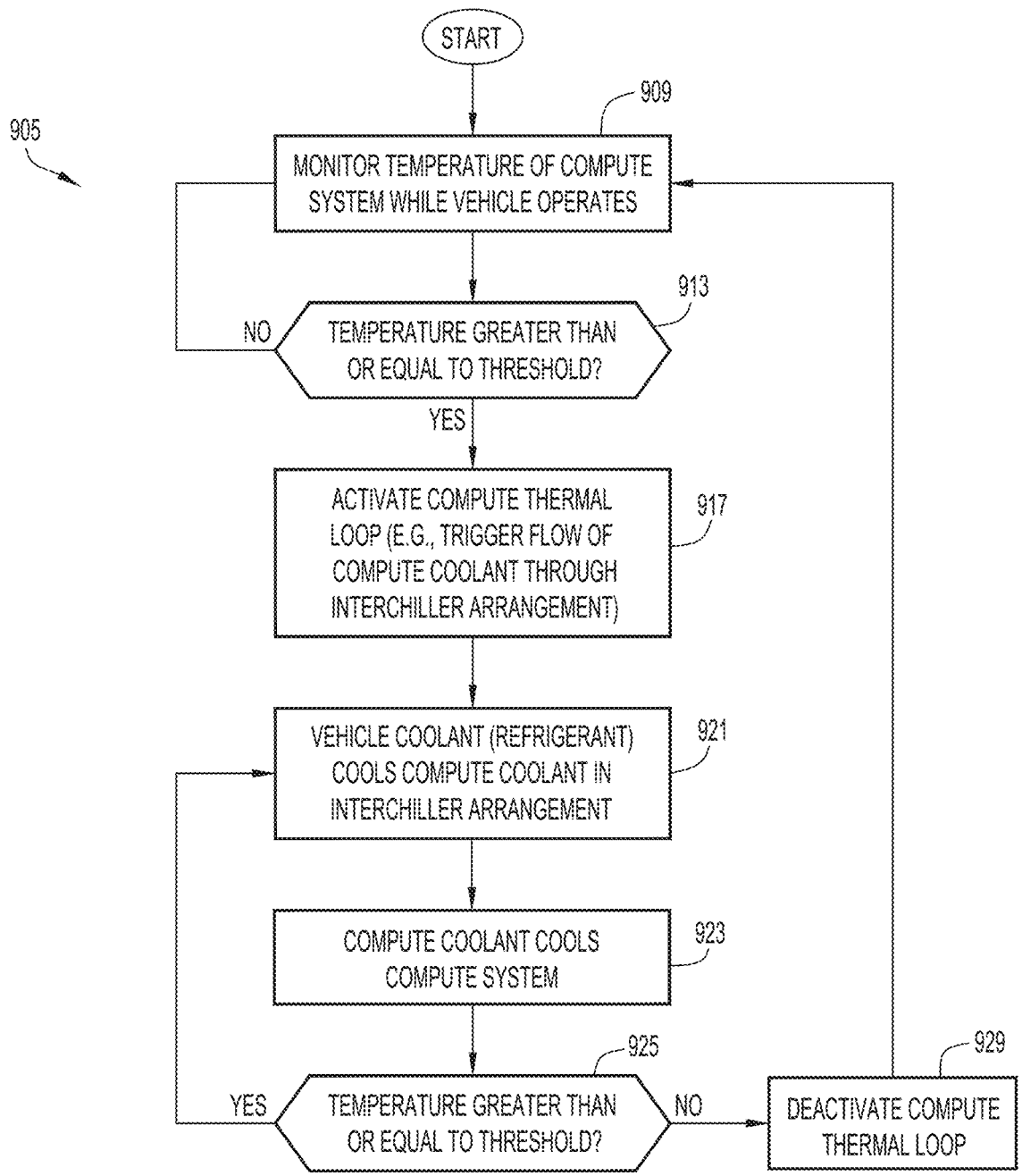
FIG. 9 is a process flow diagram which illustrates a method of effectively triggering the cooling of a computer system in accordance with an embodiment.

As mentioned above, in one embodiment, a compute coolant loop or, more generally, a compute thermal system may be arranged to provide cooling to a compute system when a threshold temperature is met or exceeded. Referring next to FIG. 9, a method of cooling a compute system of a vehicle will be described in accordance with an embodiment. A method 905 of providing cooling to a compute system of a vehicle begins at a step 909 in which the temperature of a compute system is monitored while the vehicle operates. The temperature may be monitored using any suitable method. For example, a thermometer or other temperature sensor may be used to determine a temperature in an area around the compute system, or a thermometer or other temperature sensor may be used to determine a temperature within the compute system.

In a step 913, it is determined whether the temperature of the compute system is greater than or approximately equal to a threshold temperature. If the determination is that the temperature is not greater than or approximately equal to the threshold temperature, then process flow returns to step 909 in which the temperature of the compute system continues to be monitored.

Alternatively if it is determined that the temperature of the compute system meets or exceeds the threshold temperature, the indication is that the compute system is to be cooled in order to increase the likelihood that the compute system may perform as expected. Accordingly, in a step 917, a compute thermal loop is effectively activated. By way of example, the flow of compute coolant through an interchiller arrangement may be substantially triggered by a valve which causes compute coolant to flow from a reservoir to be pumped to the interchiller arrangement.

After the compute thermal loop is activated, the vehicle coolant or refrigerant cools the compute coolant in the interchiller arrangement in a step 921. The cooling of the coolant in the computer thermal loop may be accomplished through a liquid-to-liquid transfer such that heat from the compute coolant is transferred to the vehicle coolant.

Once the vehicle coolant cools the compute coolant, the compute coolant cools the compute system in a step 923. That is, the compute coolant flows through the compute thermal loop to cool the compute system to essentially absorb heat generated by the compute system In a step 925, a determination is made as to whether the temperature of the compute system continues to be greater than or approximately equal to a threshold temperature. If the determination is that the temperature continues to be greater than or equal to the threshold temperature, the indication is that the compute system would benefit from further cooling. As such, process flow returns from step 925 to step 921 in which the vehicle coolant cools the compute coolant.

Alternatively, if it is determined in step 925 that the temperature is no longer greater than or approximately equal to the threshold, the implication is that the computer system has a temperature that is within an operating range. Accordingly, process flow moves to a step 929 in which the compute thermal loop is effectively deactivated. That is, the process of cooling; the compute coolant may be paused. After the compute thermal loop is effectively deactivated, process flow returns to step 909 in which the temperature of the compute system continues to be monitored.

The embodiments presented herein involve taking part of the refrigerant (coolant) from the vehicle's (pre-existing) air conditioning system, and direct that through an interchiller, which then expands and the resulting chilling effect then chills the secondary loop coolant that flows through the interchiller. The interchiller operates like an evaporator that has its own liquid-to-liquid heat exchanger in it. A cooling system typically can cool down to close to ambient air temperature, whereas the further cooling the compute system coolant in the interchiller by evaporation to obtain a chilling effect inside the interchiller has the ability to further cool other vehicle systems, such as one or more compute systems.

Although only a few embodiments have been described in this disclosure, it should be understood that the disclosure may be embodied in many other specific forms without departing from the spirit or the scope of the present disclosure. By way of example, while a vehicle thermal system and a compute thermal system have generally been described as providing cooling capabilities, the vehicle thermal system and the computer thermal system may generally control temperatures and/or environments. That is, in addition to or in lieu of providing cooling capabilities, a vehicle thermal system and/or a compute thermal system may provide warming capabilities and other environmental control capabilities. As mentioned above, a compute thermal system may include a heating arrangement such as a radiator which is configured to warm a coolant. A coolant may be warmed, for instance, when an ambient temperature of an environment causes the coolant to be colder than desired.

The amount of coolant which is diverted from a vehicle cooling loop to an offshoot loop may vary widely depending upon the requirements of a vehicle thermal system and/or a compute thermal system. Further, although the amount of coolant that is diverted may remain substantially constant during the operation of a vehicle, it should be appreciated that the amount of coolant which is diverted may vary. For example, the amount of coolant which is diverted may vary if additional cooling capability is needed for a compute system.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

Figure 10:
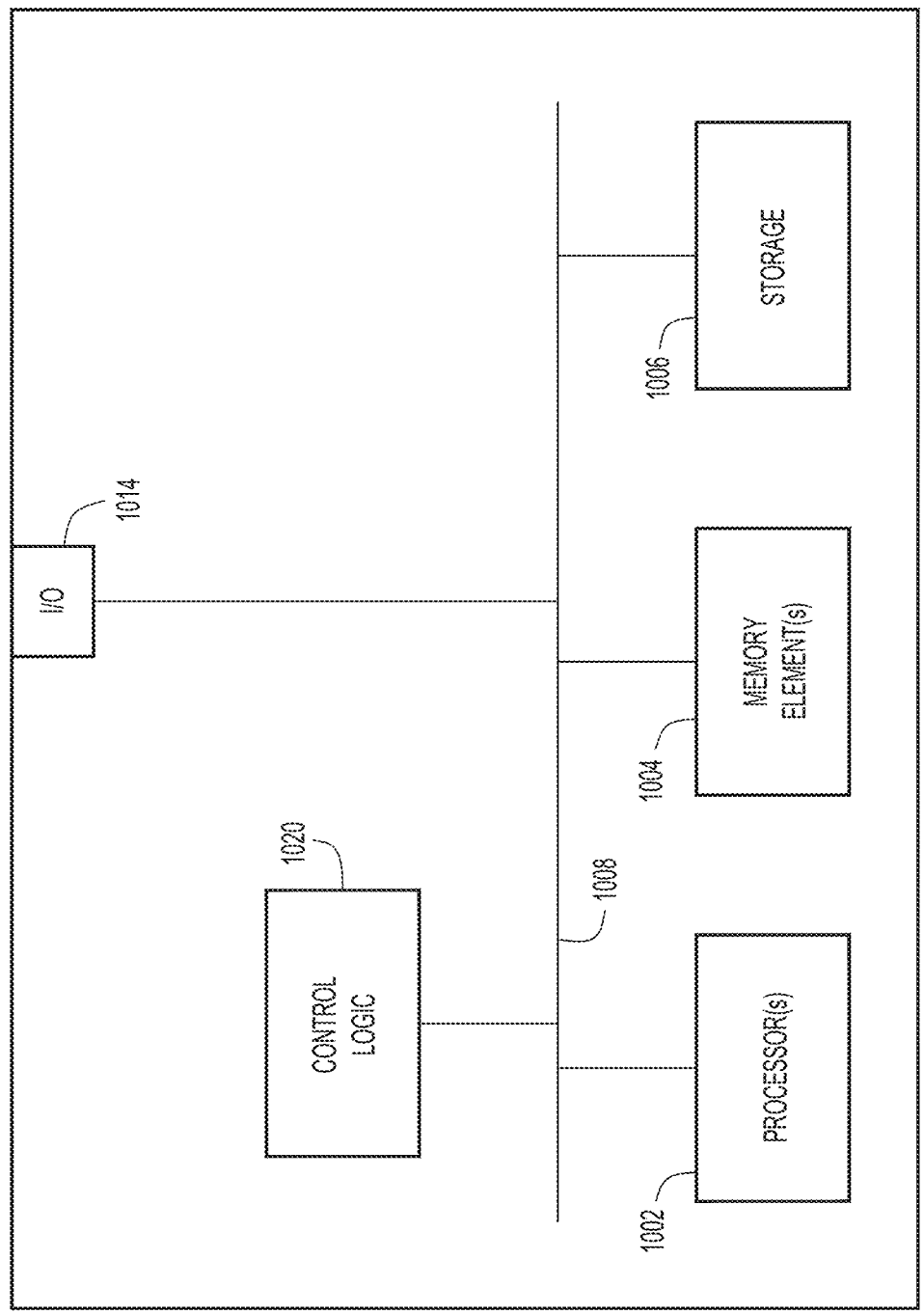
FIG. 10 is a hardware block diagram of a computing device that may be configured to participate in the control of diversion of coolant from a vehicle thermal system to a compute thermal system, according to an embodiment.

Referring to FIG. 10, FIG. 10 illustrates a hardware block diagram of a computing device 1000 that may perform functions associated with operations discussed herein in connection with the techniques depicted in FIGS. 1A, 1B and 2-9. For example, the computing device 1000 may be representative of the control system 336, shown in FIG. 3.

In at least one embodiment, the computing device 1000 may be any apparatus that may include one or more processor(s) 1002, one or more memory element(s) 1004, storage 1006, a bus 1008, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In one example, the control logic 1020 may include instructions that, when executed by the processor 1002, cause the computing device to perform various thermal management control operations, such as controlling the timing and amount of coolant diverted from the vehicle thermal system 428a to the compute thermal system 428b to boost the cooling capabilities of the compute thermal system 428b.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

To the extent that embodiments presented herein relate to the storage of data, the embodiments may employ any number of any conventional or other databases, data stores or storage structures (e.g., files, databases, data structures, data or other repositories, etc.) to store information.

In summary, in some aspects, the techniques described herein relate to in a vehicle having a first coolant loop associated with a first thermal system configured to cool a portion of the vehicle, a method including: diverting coolant flowing through the first coolant loop to an offshoot loop that provides cooling to coolant included in a second coolant loop associated with a second thermal system configured to cool one or more vehicle systems other than the portion of the vehicle.

In some aspects, the techniques described herein relate to a method, wherein diverting includes directing coolant from the first coolant loop to flow proximate the second coolant loop and thereby cool coolant in the second coolant loop, and wherein cooled coolant in the second coolant loop flows near the one or more vehicle systems to cool the one or more vehicle systems.

In some aspects, the techniques described herein relate to a method, wherein diverting includes diverting a portion of coolant from the first coolant loop to further cool, via liquid-to-liquid heat transfer, coolant in the second coolant loop and returning the portion of coolant to the first coolant loop.

In some aspects, the techniques described herein relate to a method, further including monitoring operation of the one or more vehicle systems to determine whether the one or more vehicle systems will benefit from cooling, and wherein diverting is performed in response to determining that the one or more vehicle systems will benefit from further cooling.

In some aspects, the techniques described herein relate to the method of claim 4, wherein diverting includes diverting a predetermined amount of coolant from the first coolant loop to the offshoot loop in response to determining that the one or more vehicle systems will benefit from further cooling.

In some aspects, the techniques described herein relate to a method, wherein monitoring includes determining whether a temperature of the one or more vehicle systems is greater than or equal to a threshold temperature as an indication of whether the one or more vehicle systems will benefit from further cooling.

In some aspects, the techniques described herein relate to a method, wherein diverting is performed on a substantially continuous basis regardless of whether coolant in the second coolant loop will benefit from cooling.

In some aspects, the techniques described herein relate to a method, further including: heating coolant carried through the offshoot loop.

In some aspects, the techniques described herein relate to a method, wherein the first coolant loop of the first thermal system provides cooling to a cabin of the vehicle, and the second coolant loop of the second thermal system provides cooling to one or more compute systems of the vehicle.

In some aspects, the techniques described herein relate to a vehicle thermal system including: a first thermal system having a first coolant loop configured to carrying first coolant, and configured to cool a portion of a vehicle; a second thermal system having a second coolant loop configured to carry second coolant, and configured to cool one or more vehicle systems other than the portion of the vehicle; and an offshoot loop coupled from the first coolant loop to the second coolant loop to divert first coolant from the first coolant loop to flow proximate the second coolant of the second coolant loop so as to cool the second coolant in the second coolant loop.

In some aspects, the techniques described herein relate to a vehicle thermal system, wherein: the first thermal system includes a compressor and a condenser, and is configured to cool a cabin area of the vehicle; the second thermal system includes an interchiller, a pump, and a reservoir, wherein the interchiller is configured to obtain the second coolant via the pump from the reservoir.

In some aspects, the techniques described herein relate to a vehicle thermal system, wherein the offshoot loop includes a coupling arrangement that couples the first coolant to the interchiller.

In some aspects, the techniques described herein relate to a vehicle thermal system, wherein the coupling arrangement includes a fitting that is configured to couple the first coolant to a valve of the interchiller to enable the first coolant to flow proximate the second coolant in the interchiller.

In some aspects, the techniques described herein relate to a vehicle thermal system, further including: a radiator configured to heat the first coolant carried by the offshoot loop.

In some aspects, the techniques described herein relate to a vehicle thermal system, further including a controller configured to monitor operation of the one or more vehicle systems to determine whether the one or more vehicle systems will benefit from cooling, and to divert the first coolant via the offshoot loop to the second coolant loop when it is determined that the one or more vehicle systems will benefit from further cooling.

In some aspects, the techniques described herein relate to a vehicle thermal system, wherein the controller is configured to determine whether a temperature of the one or more vehicle systems is greater than or equal to a threshold temperature as an indication of whether the one or more vehicle systems will benefit from further cooling.

In some aspects, the techniques described herein relate to a vehicle thermal system, wherein the controller is configured to adjust an amount of the first coolant is diverted via the offshoot loop to the second thermal system based on an amount of additional cooling capability desired.

In some aspects, the techniques described herein relate to a vehicle thermal system, further including controller is configured to cause diversion of the first coolant to the second coolant loop on a substantially continuous basis regardless of whether coolant in the second coolant loop will benefit from cooling.

In some aspects, the techniques described herein relate to a vehicle thermal system, wherein the first coolant loop of the first thermal system provides cooling to a cabin of the vehicle, and the second coolant loop of the second thermal system provides cooling to one or more compute systems of the vehicle.

In some aspects, the techniques described herein relate to a vehicle including: a propulsion system configured propel the vehicle; a sensor system configured to obtain sensor data relating to location, orientation and movement of the vehicle; a navigation system configured to provide navigation assistance to the vehicle, the navigation system including one or more compute systems configured to perform computations based on the sensor data; a vehicle thermal system configured to cool a portion of the vehicle; a compute thermal system configured to cool the one or more compute systems; and an offshoot loop configured to divert coolant from the vehicle thermal system to flow in proximity of coolant in the compute thermal system so as to cool the coolant in the compute thermal system.

In some aspects, the techniques described herein relate to a vehicle, wherein: the vehicle thermal system includes a compressor and a condenser, and is configured to cool a cabin area of the vehicle; the compute thermal system includes an interchiller, a pump, and a reservoir, wherein the interchiller is configured to obtain coolant via the pump from the reservoir; and the offshoot loop includes a coupling arrangement that couples the coolant from the vehicle thermal system to the interchiller.

In some aspects, the techniques described herein relate to a vehicle, further including a controller configured to monitor operation of the one or more compute systems to determine whether the one or more compute systems will benefit from cooling, and to divert coolant from the vehicle thermal system via the offshoot loop to the compute thermal system when it is determined that the one or more compute systems will benefit from further cooling.

In some aspects, the techniques described herein relate to a vehicle, wherein the controller is configured to adjust an amount of coolant is diverted via the offshoot loop from the vehicle thermal system to the compute thermal system based on an amount of additional cooling capability desired.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method comprising:
providing a first thermal system, the first thermal system configured to cool an area of a vehicle, wherein the first thermal system includes a first coolant loop, a compressor and a condenser;
providing a second thermal system, the second thermal system configured to cool one or more vehicle systems, wherein the second thermal system includes a second coolant loop, an interchiller, a pump, and a reservoir; and
diverting a first portion of coolant flowing through the first coolant loop to an offshoot loop that provides cooling to the coolant included in the second coolant loop.

2. The method of claim 1, wherein diverting includes directing coolant from the first coolant loop to flow proximate the second coolant loop and thereby cool the coolant in the second coolant loop, and wherein cooled coolant in the second coolant loop flows near the one or more vehicle systems to cool the one or more vehicle systems.

3. The method of claim 2, wherein diverting includes cooling the second coolant via liquid-to-liquid heat transfer and returning the portion of the coolant to the first coolant loop.

4. The method of claim 1, further comprising monitoring operation of the one or more vehicle systems to determine whether the one or more vehicle systems will benefit from cooling, and wherein diverting is performed in response to determining that the one or more vehicle systems will benefit from further cooling.

5. The method of claim 4, wherein the portion is a predetermined amount of the coolant diverted in response to determining that the one or more vehicle systems will benefit from further cooling.

6. The method of claim 5, wherein monitoring comprises determining whether a temperature of the one or more vehicle systems is greater than or equal to a threshold temperature as an indication of whether the one or more vehicle systems will benefit from the further cooling.

7. The method of claim 1, wherein diverting is performed on a substantially continuous basis regardless of whether the coolant in the second coolant loop will benefit from cooling.

8. The method of claim 1, further comprising:
heating coolant carried through the offshoot loop.

9. The method of claim 1, wherein the first coolant loop of the first thermal system provides cooling to a cabin of the vehicle, and wherein the second coolant loop of the second thermal system provides cooling to one or more compute systems of the vehicle.

10. A vehicle thermal system comprising:
a first thermal system having a first coolant loop configured to carry a first coolant, the first thermal system further being configured to cool a portion of a vehicle;
a second thermal system having a second coolant loop configured to carry a second coolant, the second thermal system further being configured to cool one or more vehicle systems other than the portion of the vehicle; and
an offshoot loop formed between the first coolant loop and the second coolant loop to divert a first amount of the first coolant that is less than a full amount of the first coolant from the first coolant loop to flow proximate the second coolant of the second coolant loop to cool the second coolant in the second coolant loop.

11. A vehicle thermal system comprising:
a first thermal system having a first coolant loop configured to carry a first coolant, wherein the first thermal system includes a compressor and a condenser, and wherein the first thermal compressor is configured to cool a cabin area of the vehicle;
a second thermal system having a second coolant loop configured to carry a second coolant, wherein the second thermal system includes an interchiller, a pump, and a reservoir, and wherein the interchiller is configured to obtain the second coolant via the pump from the reservoir and configured to cool one or more vehicle systems other than the cabin area of the vehicle; and
an offshoot loop coupled between the first coolant loop and the second coolant loop to divert the first coolant from the first coolant loop to flow proximate the second coolant of the second coolant loop to cool the second coolant in the second coolant loop.

12. The vehicle thermal system of claim 11, wherein the offshoot loop includes a coupling arrangement that couples the first coolant to the interchiller.

13. The vehicle thermal system of claim 12, wherein the coupling arrangement includes a fitting that is configured to couple the first coolant to a valve of the interchiller to enable the first coolant to flow proximate the second coolant in the interchiller.

14. The vehicle thermal system of claim 10, further comprising:
a radiator configured to heat the first amount of the first coolant carried by the offshoot loop.

15. The vehicle thermal system of claim 10, further comprising a controller configured to monitor operation of the one or more vehicle systems to determine whether to cool the one or more vehicle systems, and to divert the first amount of the first coolant via the offshoot loop to the second coolant loop when it is determined that the one or more vehicle systems are to be cooled.

16. The vehicle thermal system of claim 15, wherein the controller is configured to determine whether a temperature of the one or more vehicle systems is greater than or equal to a threshold temperature as an indication of whether the one or more vehicle systems are to be cooled.

17. The vehicle thermal system of claim 16, wherein the controller is configured to adjust the first amount of the first coolant to be diverted via the offshoot loop to the second thermal system based on an amount of additional cooling capability desired.

18. The vehicle thermal system of claim 10, further comprising a controller configured to cause continuous diversion of the first amount of the first coolant to the second coolant loop.

19. The vehicle thermal system of claim 10, wherein the first coolant loop of the first thermal system provides cooling to a cabin of the vehicle, and the second coolant loop of the second thermal system provides cooling to one or more compute systems of the vehicle.

20. The vehicle thermal system of claim 11, further comprising:
a radiator configured to heat the first coolant carried by the offshoot loop.

21. The vehicle thermal system of claim 11, further including:
a controller configured to monitor operation of the one or more vehicle systems to determine whether to provide cooling to the one or more vehicle systems, the controller further being configured to divert the first coolant to the second coolant loop through the offshoot loop to the second coolant loop when it is determined that cooling is to be provided to the one or more vehicle systems.

22. The vehicle thermal system of claim 21 wherein the controller is further configured to determine whether to provide cooling to the one or more vehicle systems by determining whether a temperature of the one or more vehicle systems is greater than or equal to a threshold temperature.

23. The vehicle thermal system of claim 11 wherein the second coolant loop of the second thermal system provides cooling to one or more compute systems of the vehicle.

* * * * *